(12) United States Patent
Li et al.

(10) Patent No.: US 12,332,442 B2
(45) Date of Patent: Jun. 17, 2025

(54) HIGH EFFICIENCY OPTICAL ASSEMBLY WITH FOLDED OPTICAL PATH

(71) Applicant: META PLATFORMS TECHNOLOGIES, LLC, Menlo Park, CA (US)

(72) Inventors: Gang Li, Bothell, WA (US); Brian Wheelwright, Sammamish, WA (US); Andrew Maimone, Duvall, WA (US); Yang Zhao, Kirkland, WA (US); Ying Geng, Bellevue, WA (US); Douglas Robert Lanman, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 627 days.

(21) Appl. No.: 17/540,049

(22) Filed: Dec. 1, 2021

(65) Prior Publication Data

US 2023/0168506 A1  Jun. 1, 2023

(51) Int. Cl.
*G02B 27/01* (2006.01)
(52) U.S. Cl.
CPC .. *G02B 27/0172* (2013.01); *G02B 2027/0174* (2013.01); *G02B 2027/0178* (2013.01)
(58) Field of Classification Search
None
See application file for complete search history.

(56) References Cited

U.S. PATENT DOCUMENTS

| | | |
|---|---|---|
| 10,634,907 B1 | 4/2020 | Geng et al. |
| 10,890,776 B1 | 1/2021 | Gao et al. |
| 2018/0239146 A1* | 8/2018 | Bierhuizen ........ G02B 17/0856 |
| 2018/0239177 A1* | 8/2018 | Oh ...................... G02F 1/13306 |
| 2019/0353906 A1* | 11/2019 | Gollier ................ G02B 5/3016 |
| 2021/0223548 A1 | 7/2021 | Maimone et al. |

FOREIGN PATENT DOCUMENTS

| | | | | |
|---|---|---|---|---|
| CN | 110651236 A | * | 1/2020 | ......... G02B 27/0075 |
| JP | 2009288696 A | * | 12/2009 | ......... G02B 27/0172 |

OTHER PUBLICATIONS

International Search Report and Written Opinion for International Application No. PCT/US2022/051266, mailed May 12, 2023, 10 pages.
International Preliminary Report on Patentability for International Application No. PCT/US2022/051266, mailed Jun. 13, 2024, 8 pages.

* cited by examiner

*Primary Examiner* — Bao-Luan Q Le
*Assistant Examiner* — Danell L Owens
(74) *Attorney, Agent, or Firm* — Greenberg Traurig, LLP

(57) ABSTRACT

A display device includes a display module for providing first image light. The display device also includes a first optical element for receiving and transmitting the first image light from the display module. The display module includes a region from which the first image light is provided in directions other than a direction perpendicular to the first optical element. The display device further includes a second optical element so that the second optical element receives the first image light transmitted through the first optical element and sends the received first image light back toward the first optical element as second image light. The first optical element receives the second image light from the second optical element and sends the second image light back toward the second optical element, and the second optical element receives and transmits the second image light from the first optical element.

19 Claims, 12 Drawing Sheets

HIGH EFFICIENCY OPTICAL ASSEMBLY WITH FOLDED OPTICAL PATH

TECHNICAL FIELD

This relates generally to head-mounted display devices, and more specifically to optical components used in head-mounted display devices.

BACKGROUND

Head-mounted display devices (also called herein head-mounted displays) are gaining popularity as a means for providing visual information to users.

However, the size and weight of conventional head-mounted display devices have limited application of head-mounted display devices.

SUMMARY

Accordingly, there is a need for head-mounted display devices that are thin and lightweight. Compact head-mounted display devices would also improve user satisfaction with such devices.

The deficiencies and other problems discussed in the background are reduced or eliminated by the disclosed devices, systems, and methods.

In accordance with some embodiments, a display device includes a display module for providing first image light. The display device also includes a first optical element positioned relative to the display module for receiving the first image light from the display module and transmitting the first image light. The display module includes at least a first region from which the first image light is provided in one or more directions other than a direction perpendicular to the first optical element. The display device further includes a second optical element separate from and positioned relative to the first optical element so that the second optical element receives the first image light transmitted through the first optical element and sends the received first image light back toward the first optical element as second image light. The first optical element receives the second image light from the second optical element and sends the second image light back toward the second optical element, and the second optical element receives and transmits the second image light from the first optical element. In some embodiments, the display module includes a backlight that is tilted relative to the direction perpendicular to the first optical element (or the second optical element). This allows the light from the backlight to illuminate the second optical element at a pre-tilted angle, which can prevent or reduce any light leaked by the second optical element from propagating toward an eye of a viewer.

In accordance with some embodiments, a head-mounted display module includes any display device described herein.

In accordance with some embodiments, an optical assembly includes a first optical element and a second optical element separate from and positioned relative to the first optical element so that the second optical element receives first light transmitted through the first optical element in one or more directions other than a direction perpendicular to the first optical element and sends the received first light back toward the first optical element as second light. The first optical element receives the second light from the second optical element and sends the second light back to the second optical element, and the second optical element receives and transmits the second light from the first optical element.

Thus, the disclosed embodiments provide devices and methods that provide an enhanced form factor and optical performance in a compact head-mounted display device configuration.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
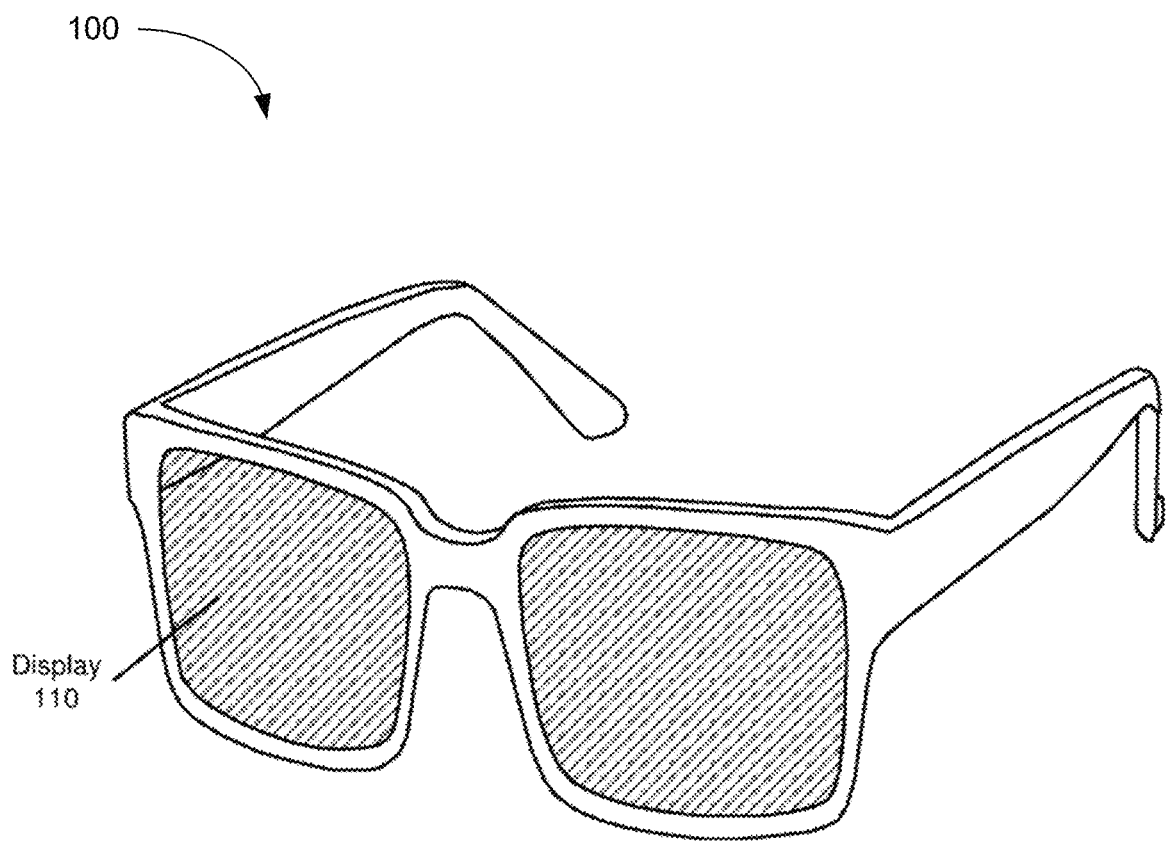
FIG. 1 is a perspective view of a display device in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on a head of a user or to be included as part of a helmet or headset, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual content (e.g., augmented reality content, virtual reality content, mixed reality content, or any combination thereof) to a user.

In some embodiments, display device 100 includes one or more components described below with respect to FIG. 2. In some embodiments, display device 100 includes additional components not shown in FIG. 2.

Figure 2:
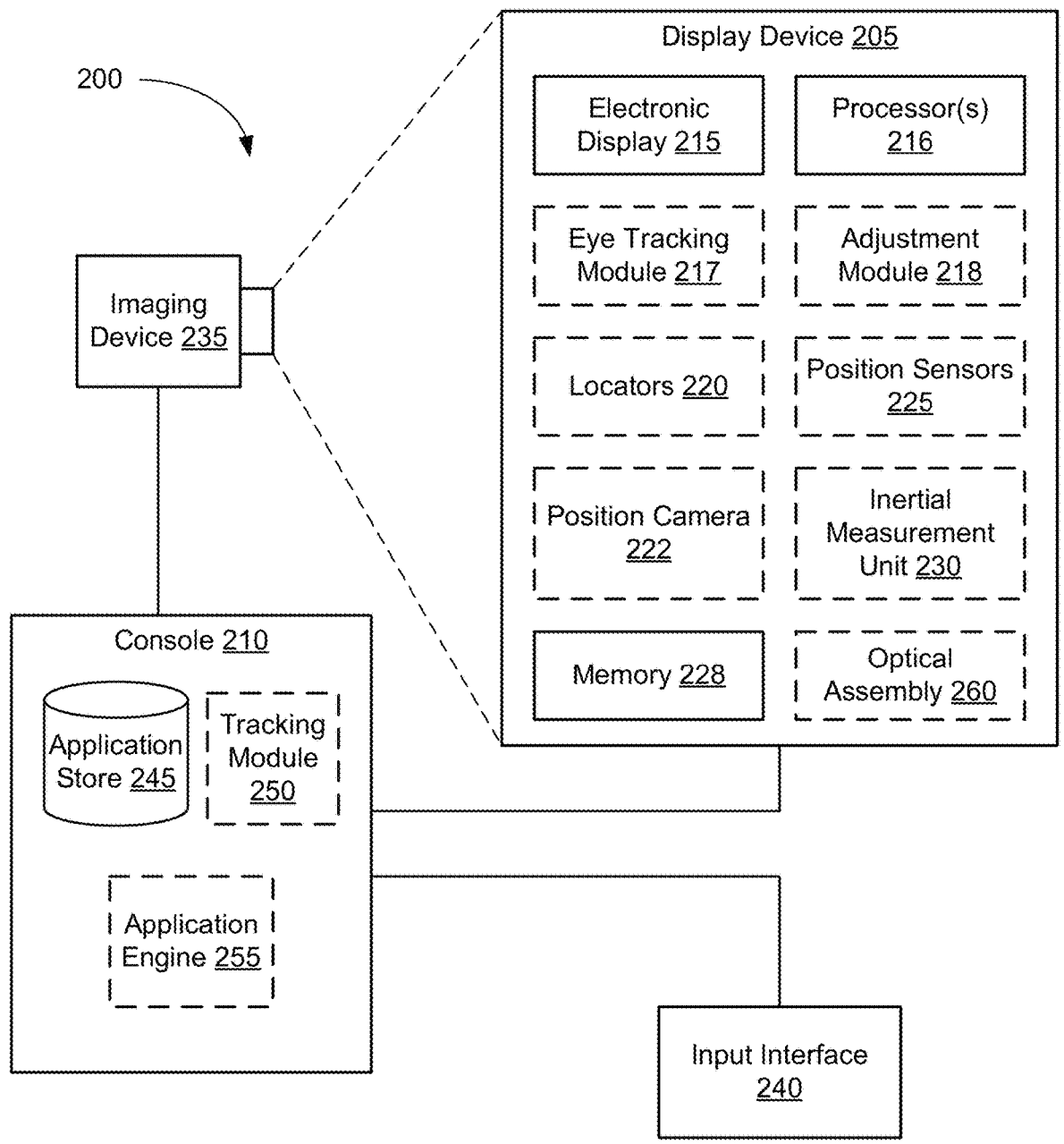
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and/or augmented reality.

In some embodiments, as shown in FIG. 1, display device 205 is a head-mounted display that presents media to a user. Examples of media presented by display device 205 include one or more images, video, audio, haptics, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 can augment views of a physical, real-world environment with computer-generated elements (e.g., images, video, sound, haptics, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display such that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is optionally configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
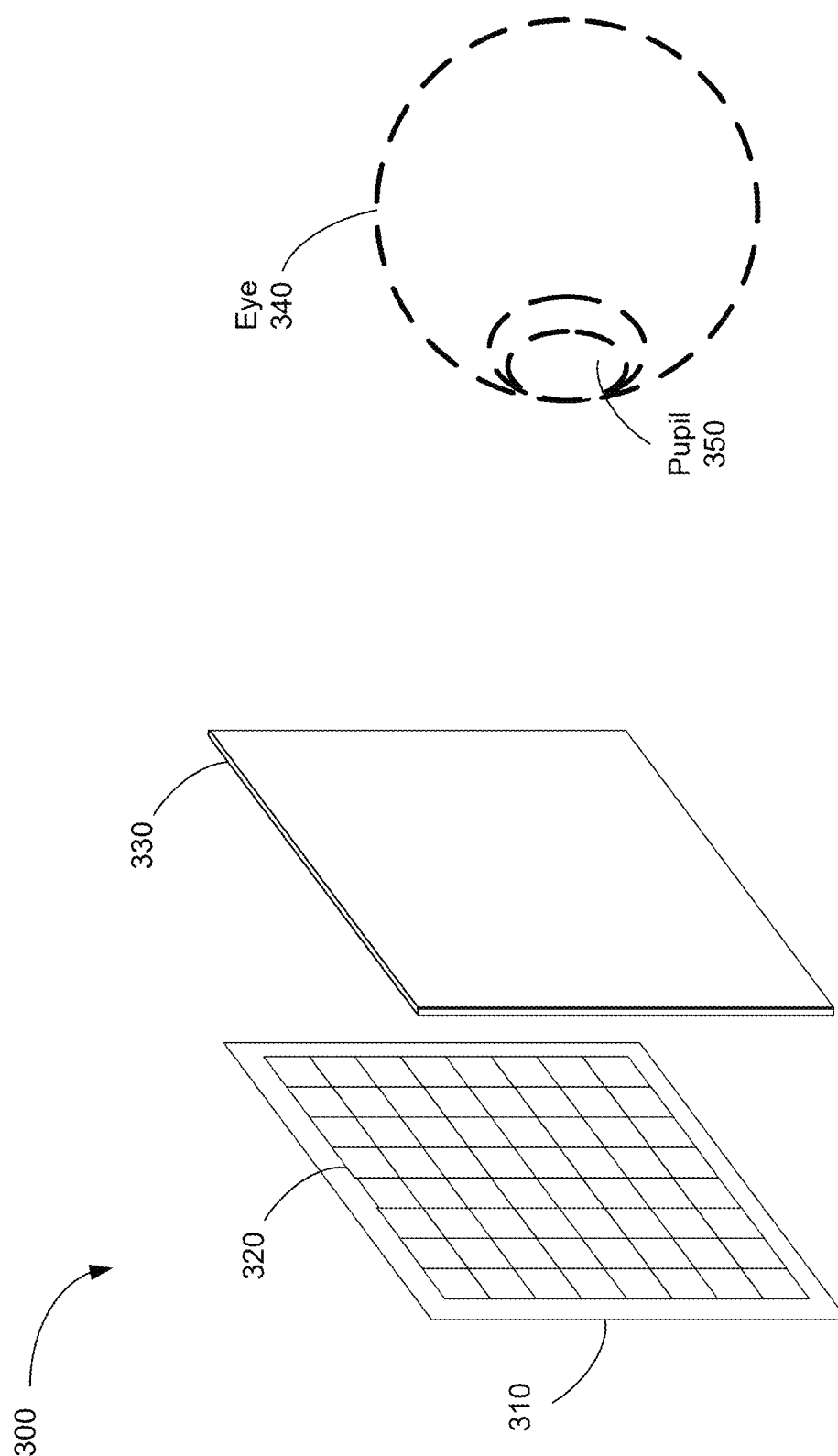
FIG. 3 is an isometric view of a display device in accordance with some embodiments.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330. In some embodiments, display device 300 also includes an emission intensity array and an IR detector array.

Light emission device array 310 emits image light and optional IR light toward the viewing user. Light emission device array 310 may be a combination of a backlight and an emission intensity array (e.g., a spatial light modulator, such as a liquid crystal display (LCD) panel). In some embodiments, the backlight includes a coherent light source (e.g., a laser). Alternatively, light emission device array 310 may be e.g., an array of LEDs, an array of microLEDs, an array of OLEDs, or some combination thereof. Light emission device array 310 includes light emission devices 320 that emit light in the visible light (and optionally includes devices that emit light in the IR). In some embodiments, a microLED includes an LED with an emission area characterized by a representative dimension (e.g., a diameter, a width, a height, etc.) of 100 μm or less (e.g., 50 μm, 20 μm, etc.). In some embodiments, a microLED has an emission area having a shape of a circle or a rectangle.

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from emission device array 310), and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element.

Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 4:
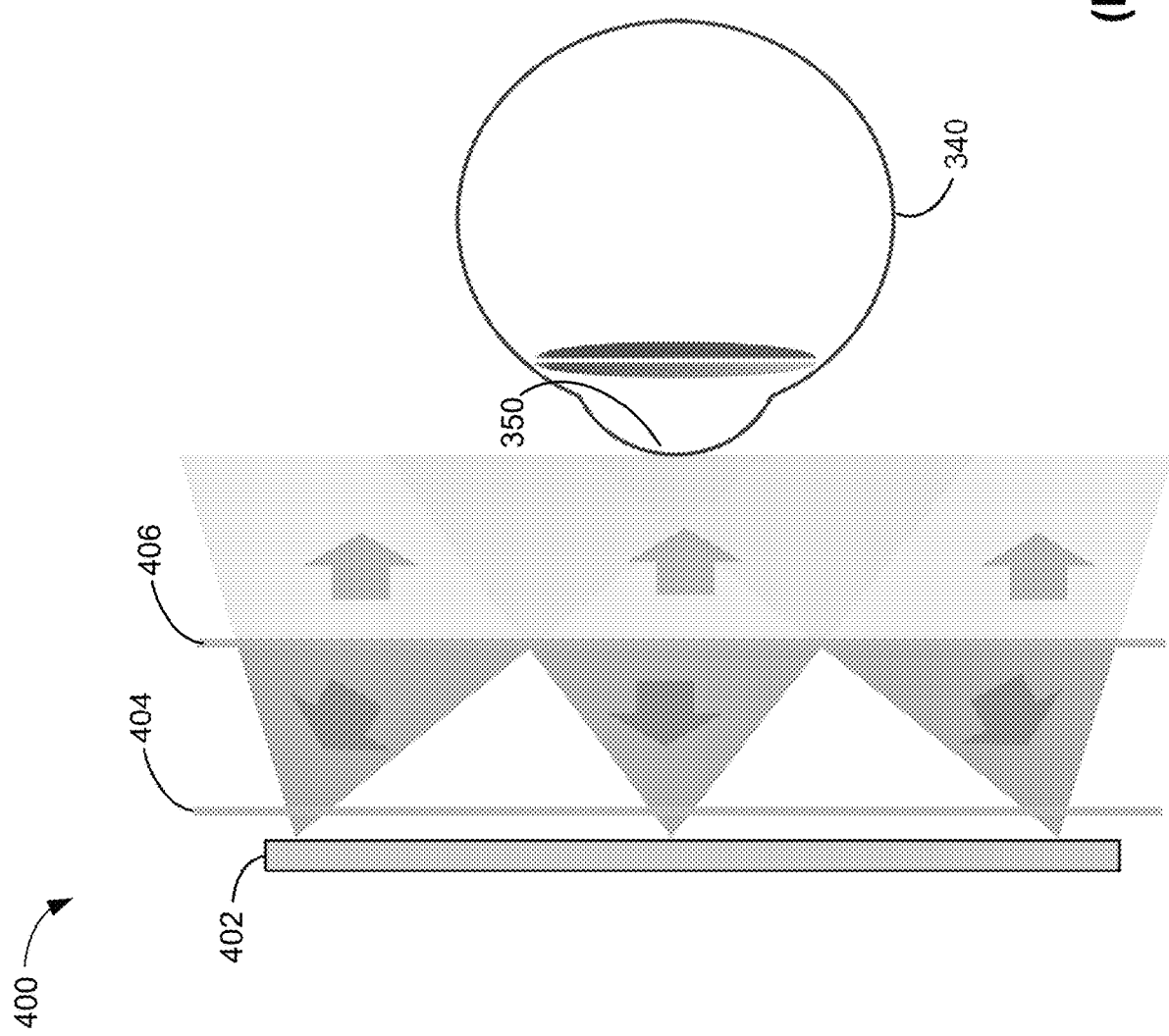
FIG. 4 illustrates a display device in which optical artifacts are generated due to a direct transmission of light from a display to an eye.

FIG. 4 illustrates a display device 400 in which optical artifacts are generated due to a direct transmission of light from a display to an eye. The display device 400 includes a display panel 402 for providing image light and a holographic optical element 404 for directing (e.g., focusing) the image light, as shown on the left side of FIG. 4. However, the diffraction efficiency of holographic optical elements is limited (e.g., not 100%), and thus, a portion of the image light from the display panel 402 may pass through the holographic optical element 404 (e.g., without diffraction as shown on the right hand side of FIG. 4)), which leads to optical artifacts. Such optical artifacts may induce ghost images and may result in decreased contrast in the displayed image.

In certain conventional display devices, polarization selective optics may be used to reduce the optical artifacts. However, addition of polarization selective optics may increase the weight of the display device. In addition, the polarization selective optics may reduce the overall efficiency of the display device. Display devices described with respect to FIGS. 5A-5C allow reduction of such optical artifacts without using polarization selective optics. However, in some configurations, such display devices may include polarization selective optics for further reduction of optical artifacts or other purposes.

Figure 5A:
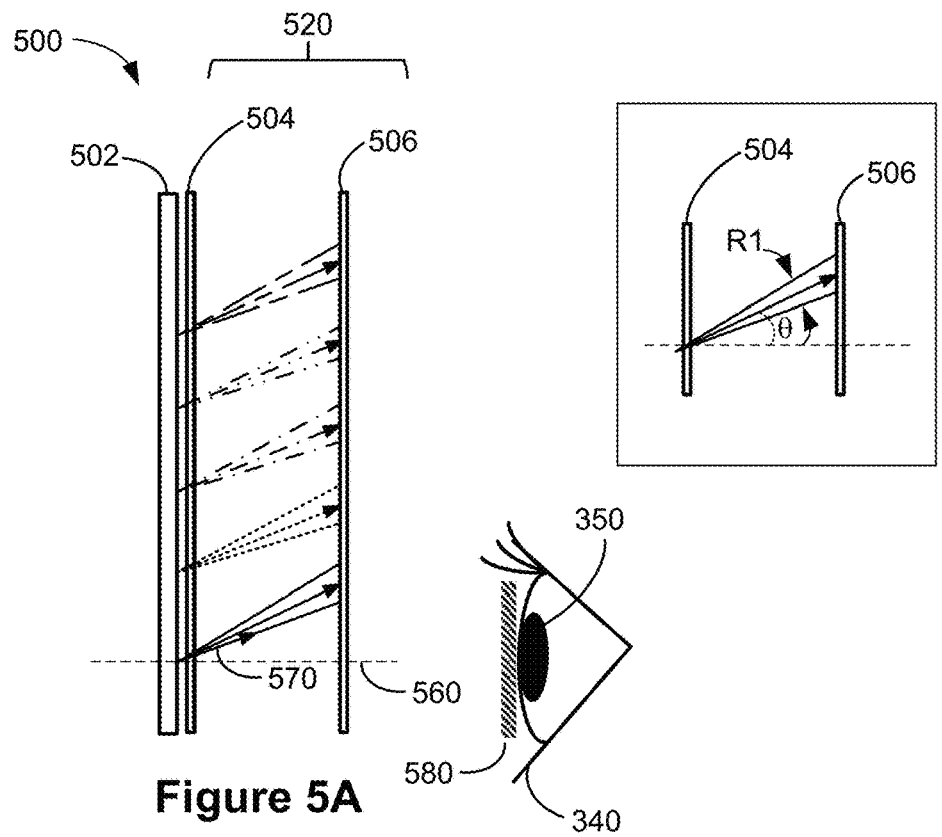
FIGS. 5A-5C are schematic diagrams illustrating operations of a display device in accordance with some embodiments.
Figure 5B:
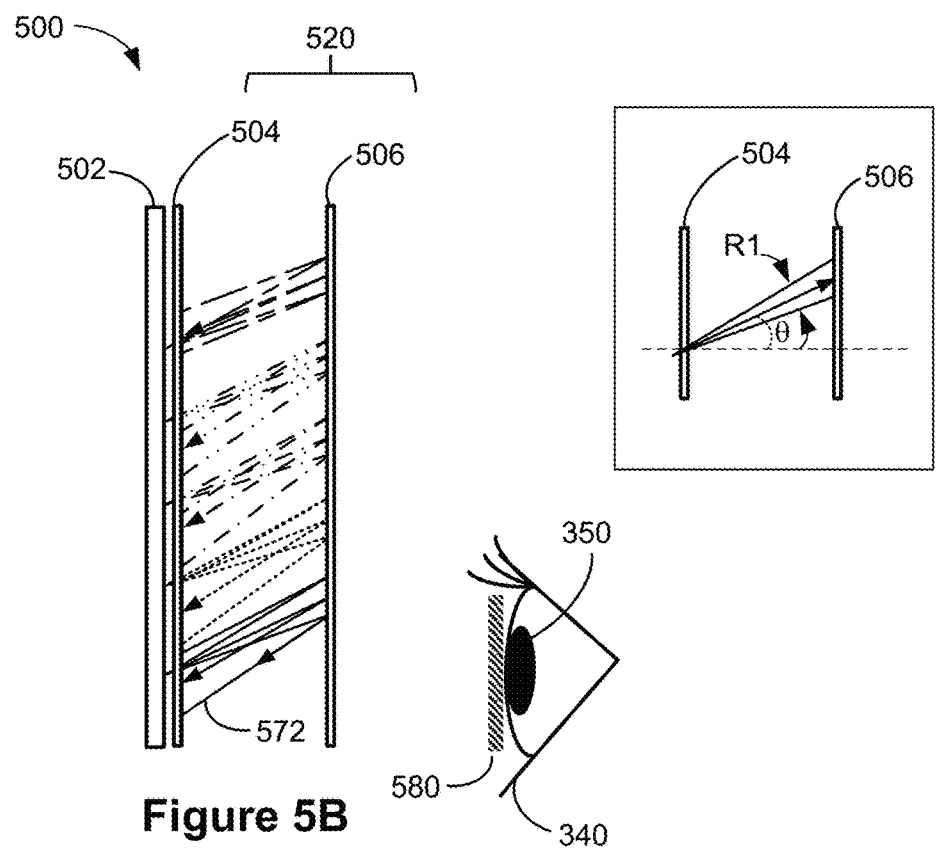
Figure 5C:
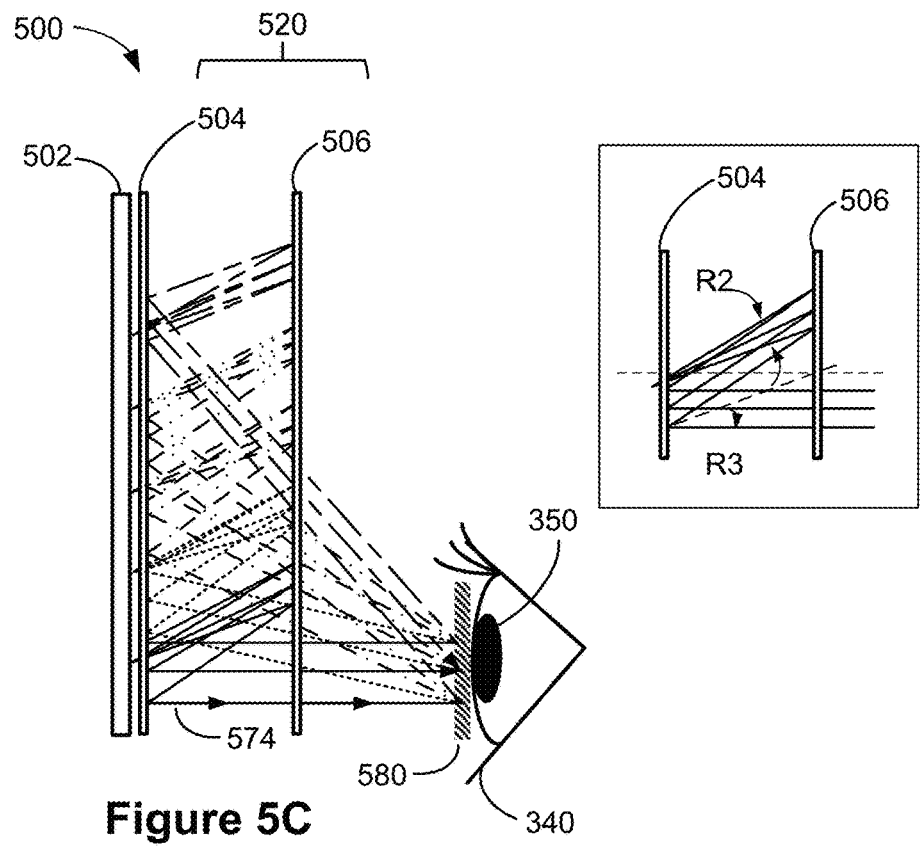

FIGS. 5A-5C are schematic diagrams illustrating operations of a display device 500 in accordance with some embodiments. The display device 500 shown in FIGS. 5A-5C reduce the optical artifacts associated with the display device 400 shown in FIG. 4. In addition, the display device 500 does not need polarization selective optics (although the display device 500 may include polarization selective optics for other benefits), thereby providing a high optical efficiency (e.g., by reducing optical losses). The elimination of polarization selective optics also reduces the weight of the display device.

In FIGS. 5A-5C, the display device 500 includes a display module 502 and an optical assembly 520 that includes a first optical element 504 and a second optical element 506. In some embodiments, the display module 502 includes a light source, such as a laser, and a spatial light modulator, such as a liquid crystal display panel. In some embodiments, the display module 502 also includes an optical diffuser. FIG. 5A shows that the display module 502 provides image light 570 in directions that are different from a direction (or an axis) perpendicular to the first optical element 504 (e.g., direction 560). For example, in some configurations, the display module 502 may be configured to provide the image light 570 only in directions that are non-parallel to the direction perpendicular to the first optical element 504 (e.g., direction 560). Because the image light 570 from the display module 502 is provided at oblique angle(s), the image light 570 may avoid the eyebox area corresponding to a reference pupil 580. The reference pupil 580 corresponds to a position of a pupil 350 of an eye 340 of a user when the display device 500 is in use (e.g., when the display device 500 is placed on a user as part of a head-mounted display device).

In some embodiments, the image light 570 provided at a respective location on the display module 502 is tilted by at least 5, 6, 7, 8, 9, 10, 11, 12, 13, 14, 15, 16, 17, 18, 19, 20, 21, 22, 23, 24, or 25 degrees relative to the direction 560 or within any interval between any two of the aforementioned angles.

In some embodiments, the angle at which the image light 570 provided at respective locations on the display module 502 is uniform across the display module 502. In some embodiments, the angle at which the image light 570 provided at respective locations on the display module 502 varies across the display module 502. For example, in some configurations, the tilt angle is a function of a distance from a center of the display module 502 (e.g., the image light emitted adjacent to the center of the display module 502 has a first tilt angle and the image light emitted away from the center of the display module 502 has a second tilt angle less than the first tilt angle).

In some embodiments, the eyebox (or the reference pupil 580) has a width of 5, 6, 7, 8, 9, 10, 11, 12, 13, 14, 15, 16, 17, 18, 19, 20, 21, 22, 23, 24, or 25 mm or within any interval between any two of the aforementioned widths.

In some embodiments, the eyebox (or the reference pupil 580) is located at a distance (also called an eye relief) of 10, 11, 12, 13, 14, 15, 16, 17, 18, 19, 20, 21, 22, 23, 24, 25, 26, 27, 28, 29, or 30 mm or within any interval between any two of the aforementioned distances from the second optical element 506.

FIG. 5A also shows that at least a portion (e.g., a substantial portion, such as at least 50%, 60%, 70%, 80%, 90%, 95%, 97%, 98%, 99%, or 99.9% or within an interval between any two of the aforementioned values) of the image light 570 from the display module 502 is transmitted (e.g., without diffraction) through the first optical element 504 (e.g., with or without refraction) toward the second optical element 506 so that the second optical element 506 receives the transmitted portion of the image light 570. In some embodiments, the first optical element 504 is an angle-dependent reflector. In some embodiments, the first optical element 504 is configured to transmit light within a first range R1 of incident angles (e.g., a range of incident angle θ shown in the inset, such as a range of an incident angle between 10° and 20° on the y-z plane; for example, a chief ray having an incident angle of 15° relative to a surface normal of the first optical element 504) and reflect (or reflectively diffract) light within a second range of incident angles mutually exclusive to the first range of incident angles.

FIG. 5B shows that the second optical element 506 sends at least a portion of the received image light 570 back toward the first optical element 504 as second image light 572 (e.g., by diffraction or reflection) so that the first optical element 504 receives the second image light 572. In some embodiments, the second optical element 506 is an angle-dependent reflector. In some embodiments, the second optical element 506 is configured to reflect (or reflectively diffract) light within the first range R1 of incident angles and transmit light within a third range of incident angles mutually exclusive to the first range of incident angles.

In addition, FIG. 5B shows that the incidence angle and the reflection angle does not match between the rays impinging on the second optical element 506 and the rays reflected (or reflectively diffracted) by the second optical element 506. In some embodiments, this is enabled by using a holographic optical element as the second optical element 506.

FIG. 5C shows that the first optical element 504 sends at least a portion (e.g., a substantial portion, such as at least 50%, 60%, 70%, 80%, 90%, 95%, or 99%) of the second image light 572 back toward the second optical element 506 as image light 574 (e.g., by diffraction or reflection) so that the second optical element 506 receives the portion of the image light 574. In some embodiments, the first optical element 504 includes a holographic optical element. In configurations with the holographic optical element as the first optical element 504, as shown in FIG. 5C, the incidence angle and the diffraction angle do not need to match between the rays impinging on the first optical element 504 and the rays reflectively diffracted by the first optical element 504.

In addition, FIG. 5C also shows that at least a portion (e.g., a substantial portion) of the image light 574 is transmitted (e.g., without diffraction) through the second optical element 506 (e.g., with or without refraction) toward the reference pupil 580. The transmitted portion of the image light 574 may converge to the eyebox region (e.g., the reference pupil 580).

As explained herein with respect to FIGS. 5A and 5B, in some embodiments, the first optical element 504 is configured to transmit light within the first range R1 of incident angles (e.g., having an incident angle between 10° and 20° on the y-z plane) relative to a surface normal of the first optical element 504) and reflect (or reflectively diffract) light within a second range R2 of incident angles (shown in the inset; e.g., having an incident angle between 20° and 40° on the y-z plane), and the second optical element 506 is configured to reflect (or reflectively diffract) light within the first range R1 of incident angles and transmit light within a third range R3 of incident angles (shown in the inset). In some embodiments, the first range of incident angles, the second range of incident angles, and the third range of incident angles vary across the first optical element 504 or the second optical element 506 (e.g., the transmission angles and the reflection angles vary across the first optical element 504 and across the second optical element 506).

Figure 5D:
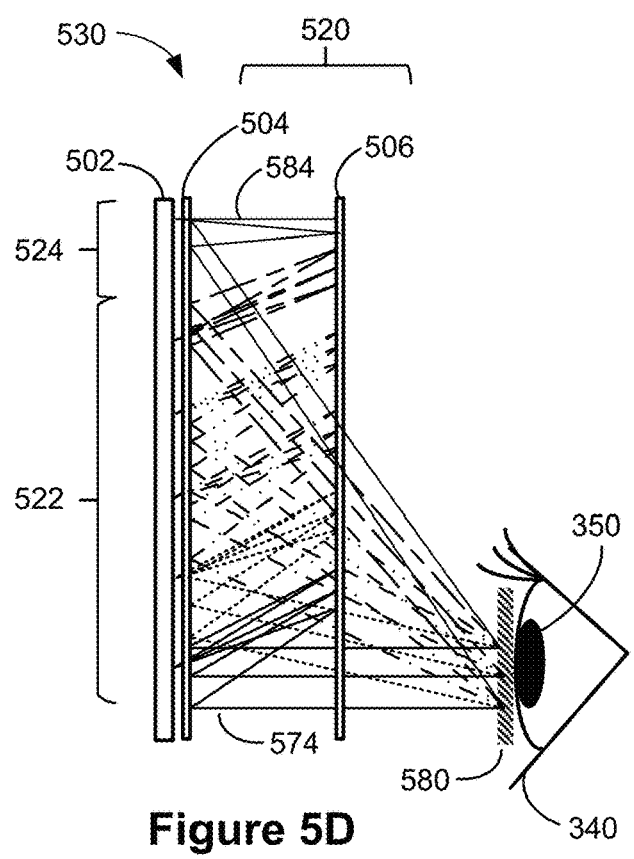
FIGS. 5D-5F are schematic diagrams illustrating display assemblies in accordance with some other embodiments.

FIG. 5D is a schematic diagram illustrating a display device 530 in accordance with some other embodiments.

The display device 530 is similar to the display device 500 described with respect to FIGS. 5A-5C, except that the display module 502 of the display device 530 includes a first region 522 (e.g., a central region) from which the image light 570 is provided in directions that are different from the direction (or an axis) perpendicular to the first optical element 504 (e.g., direction 560) and a second region 524 (e.g., a peripheral region) from which image light 584 is provided in one or more directions including a direction perpendicular to the first optical element 504. Because the second region 524 is located away from the central region of the display module, the image light 584 emitted from the second region 524, even if provided in the direction perpendicular to the first optical element 504, may not enter the reference pupil 580 without diffraction by any of the first optical element 504 or the second optical element 506. Although FIG. 5D shows two regions of the display module 502 providing the image light in distinct directions, in some other embodiments, the display module 502 may have three or more regions providing the image light in distinct directions (e.g., the first region providing light in a first direction, the second region providing light in a second direction, and the third region providing light in a third direction, where the first direction, the second direction, and the third direction are distinct from one another). In some embodiments, the display module 502 has four or more regions for providing the image light in distinct directions so that the difference in directions of the light provided by two adjacent regions is small (e.g., less than 5°, 4°, 3°, 2°, or 1°).

Figure 5E:
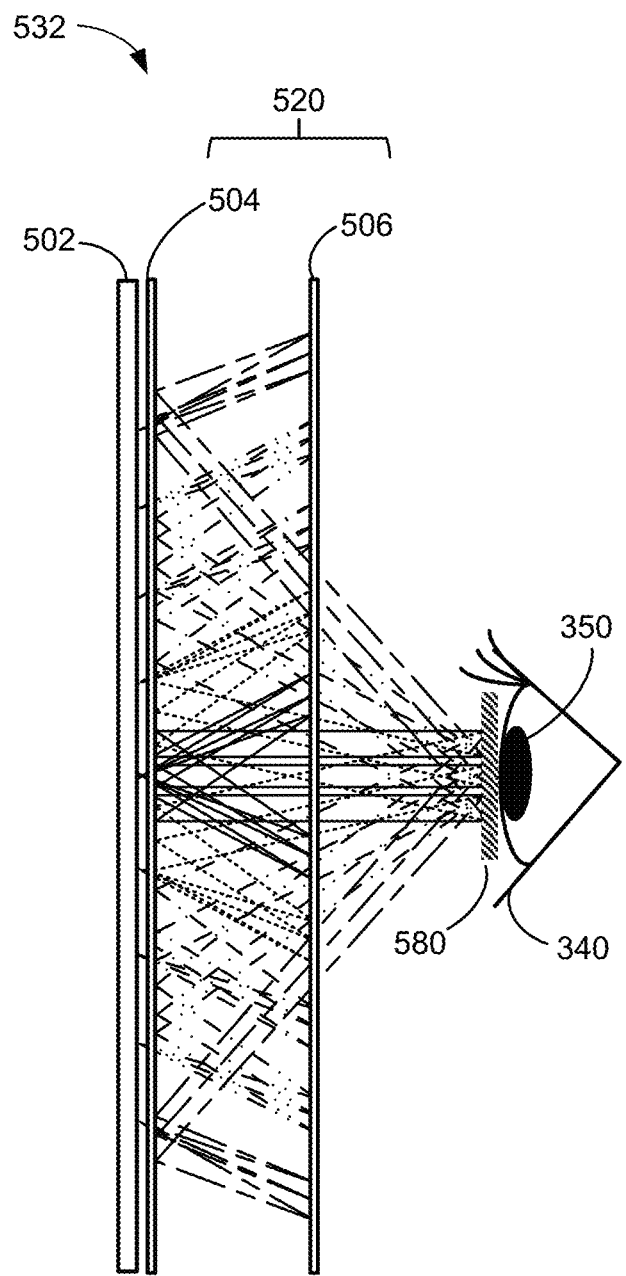

FIG. 5E is a schematic diagram illustrating a display device 532 in accordance with some other embodiments. The display device 532 is similar to the display device 500 described with respect to FIGS. 5A-5C, except that the display device 532 has an increased height. This allows the display device 532 to extend across the field of view of the eye 340. In some embodiments, the display module 502 extends contiguously to provide the image light filling the field of view of the eye 340. In some embodiments, two or more display modules are used (e.g., the display device 534 shown in FIG. 5F includes two or more display modules 502 and 512). In some embodiments, the two or more display modules are arranged (or placed) in an axial symmetry. In some embodiments, the two or more display modules are positioned adjacently to one another (in some cases, this arrangement is called a tiled display or a tiled display module). In some embodiments, the two or more display modules are in contact with one another. In some embodiments, the two or more display modules are spaced apart from one another. For example, in FIG. 5F, the display module 502 and the display module 512 are spaced apart by spacing in a central region 526. In some embodiments, the display device also includes an eye tracking device 528 (e.g., an on-axis eye tracking system) adjacent to the central region 526.

Using the folded optical paths shown in FIGS. 5A-5F enables compact display devices as the folded optical paths can be implemented over a shorter physical distance than unfolded optical paths.

Figure 6:
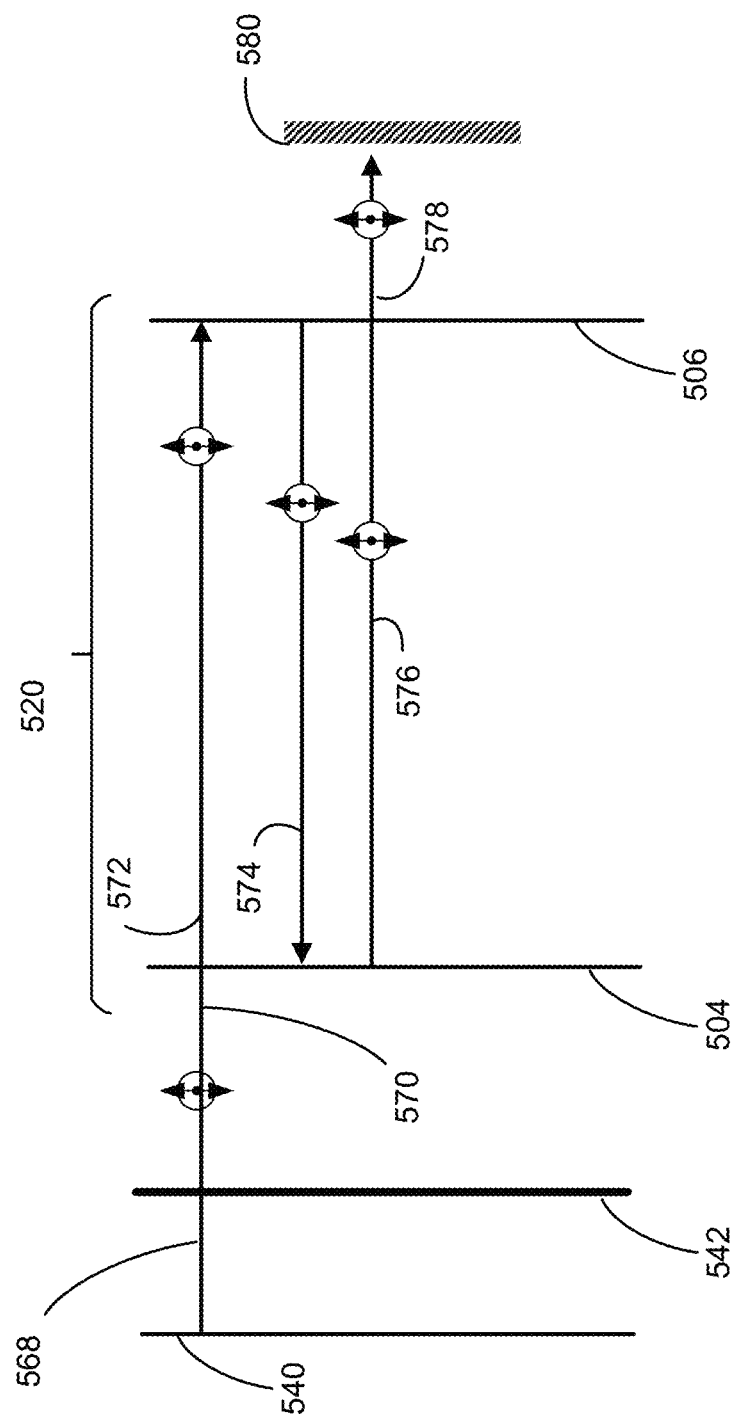
FIG. 6 is a schematic diagram illustrating an optical path for a display device in accordance with some embodiments.

FIG. 6 is a schematic diagram illustrating a folded optical path for a display device in accordance with some embodiments.

In FIG. 6, a display module including a light source 540 (e.g., a backlight) and a spatial light modulator 542 is shown. The light source 540 provides illumination light 568 to the spatial light modulator 542, which, in turn provides image light 570. The image light 570 is transmitted through the first optical element 504 and is provided to the second optical element 506 as light 572. The second optical element 506 receives the light 572 and sends back (e.g., reflectively diffracts) the light 572 as light 574 toward the first optical element 504. The first optical element 504 receives the light 574 and sends back (e.g., reflectively diffracts) the light 574 as light 576 toward the second optical element 506. The light 576 is transmitted through the second optical element 506 as light 578 toward the reference pupil 580.

In some embodiments, the first optical element 504 is a holographic optical element (e.g., a reflective holographic optical element). In some embodiments, the second optical element 506 is a holographic optical element (e.g., a reflective holographic optical element). In some embodiments, both the first optical element 504 and the second optical element 506 are holographic optical elements (e.g., reflective holographic optical elements). In some embodiments, the first optical element 504 and the second optical element 506 are freeform holographic optical elements. Compared to a display device that includes one or more polarization selective optics (e.g., a polarization-dependent reflector), which may reflect less than 50% of non-polarized light, a display device with the holographic optical elements may maintain an efficiency above 50% (e.g., 70%, 80%, 90%, etc.) even when such display device is used with non-polarized light (e.g., the first optical element 504 and the second optical element 506 may operate with both a light component having a first polarization (e.g., a horizontal polarization) and a light component having a second polarization (e.g., a vertical polarization) that is orthogonal to the first polarization).

FIGS. 7A-7F are schematic diagrams illustrating light sources in accordance with some embodiments. As described herein with respect to FIG. 6, the display module may include one or more light sources 540 for providing illumination light (e.g., light that illuminates a spatial light modulator) in off-axis directions.

Figure 7A:
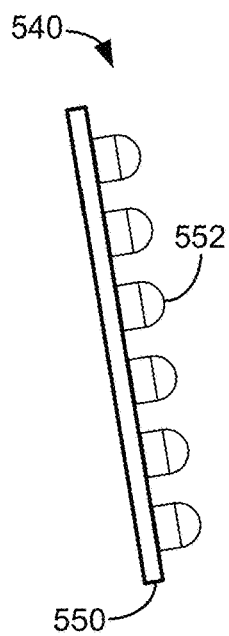
FIGS. 7A-7F are schematic diagrams illustrating light sources in accordance with some embodiments.

FIG. 7A shows a light source 540 with one or more light emitters 552. When the light source 540 includes a plurality of light emitters 552, the plurality of light emitters 552 may be placed on a substrate 550. In FIG. 7A, the one or more light emitters 552 (and the substrate 550 on which the light emitters 552 are mounted) are tilted to provide off-axis illumination light.

Figure 7B:
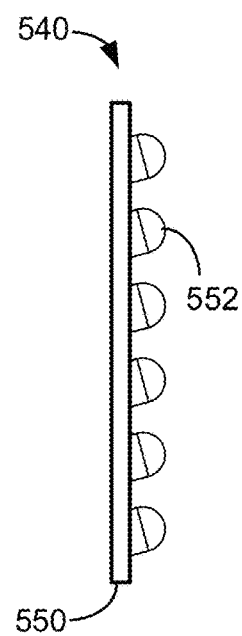

FIG. 7B shows a light source 540 with one or more light emitters 552 that are mounted at a tilted angle on the substrate 550.

Figure 7C:
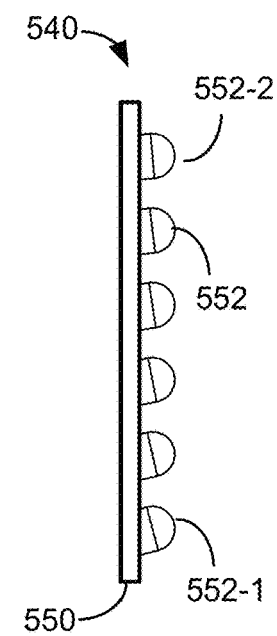

FIG. 7C shows a light source 540 with one or more light emitters 552 that are mounted at tilted angles on the substrate 550. The one or more light emitters 552 include a first light emitter 552-1 tilted at a first angle and a second light emitter 552-2 tilted at a second angle that is distinct from the first angle.

Figure 7D:
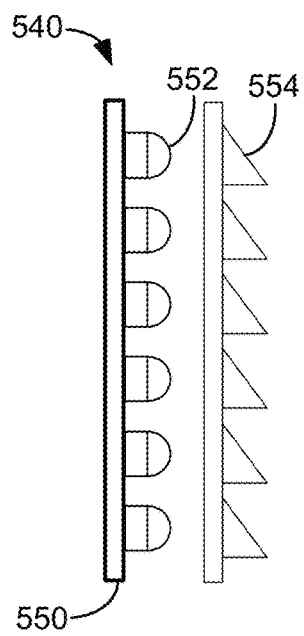

FIG. 7D shows a light source 540 with one or more light emitters 552 mounted on a substrate 550. Although the one or more light emitters 552 are not tilted in FIG. 7D, the light source 540 shown in FIG. 7D includes beam tilting optics (e.g., one or more prisms 554) for steering the illumination light from the light emitters 552 into one or more off-axis directions.

Figure 7E:
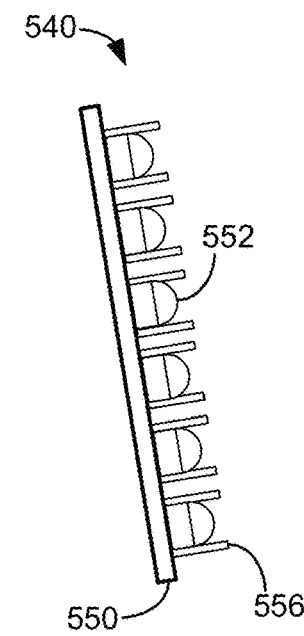

FIG. 7E shows a light source 540 that is similar to the light source 540 shown in FIG. 7A except that the light source 540 in FIG. 7E includes one or more baffles 556 for enhancing directionality of the emitted illumination light.

In some embodiments, the light emitters 552 include one or more of: a light emitting diode (e.g., an organic light emitting diode or an active-matrix organic light-emitting diode) or a laser (e.g., a VCSEL).

Figure 7F:
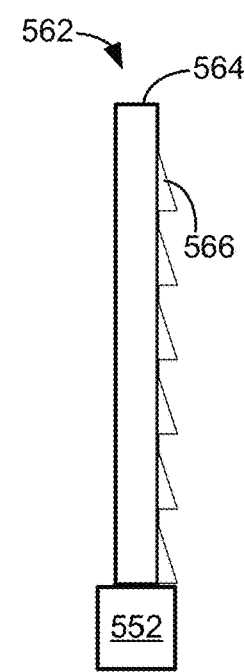

FIG. 7F shows a light source 562 that includes a waveguide 564 coupled with one or more light emitters 552. In some embodiments, the waveguide 564 is coupled with one or more output couplers 566 for outputting light in off-axis directions.

FIGS. 7G-7J are schematic diagrams illustrating display modules in accordance with some embodiments.

Figure 7G:
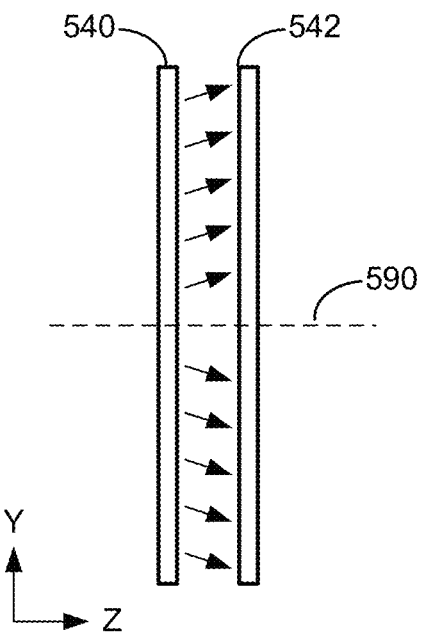
FIGS. 7G-7J are schematic diagrams illustrating display modules in accordance with some embodiments.

FIG. 7G shows a configuration in which the light source 540 provides illumination light at a common tilted angle (relative to an optical axis 590) in the y-z plane across a respective half of the light source 540 toward the spatial light modulator 542.

Figure 7H:
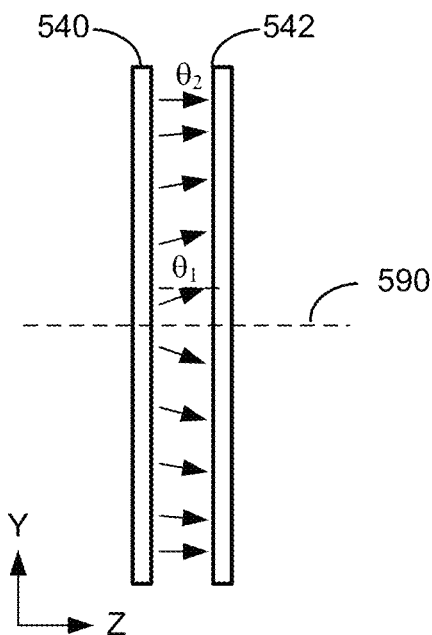

FIG. 7H shows a configuration in which the light source 540 provides illumination light at (gradually) varying tilted angles (relative to an optical axis 590) across the light source 540 toward the spatial light modulator 542. For example, a first portion (e.g., a top portion) of the light source 540 provides illumination light at a first tilt angle $\theta_1$ (relative to an optical axis 590) and a second portion (e.g., a middle portion) of the light source 540 provides illumination light at a second tilt angle $\theta_2$ (relative to an optical axis 590) distinct from the first tile angle $\theta_1$ in the y-z plane.

Figure 7I:
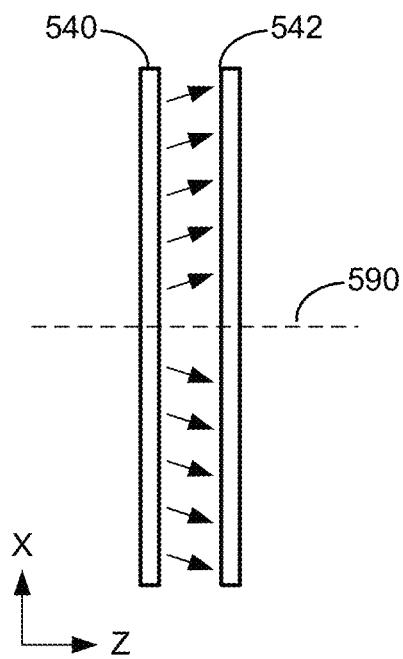

FIG. 7I shows a configuration in which the light source 540 provides illumination light at a common tilted angle (relative to an optical axis 590) in the x-z plane across a respective half of the light source 540 toward the spatial light modulator 542.

FIG. 7H shows a configuration in which the light source 540 provides illumination light at varying tilted angles (relative to an optical axis 590) across the light source 540 toward the spatial light modulator 542. For example, a first portion (e.g., a top portion) of the light source 540 provides illumination light at a first tilt angle $\theta_1$ (relative to an optical axis 590) and a second portion (e.g., a middle portion) of the light source 540 provides illumination light at a second tilt angle $\theta_2$ (relative to an optical axis 590) distinct from the first tile angle $\theta_1$ in the x-z plane.

Figure 7J:
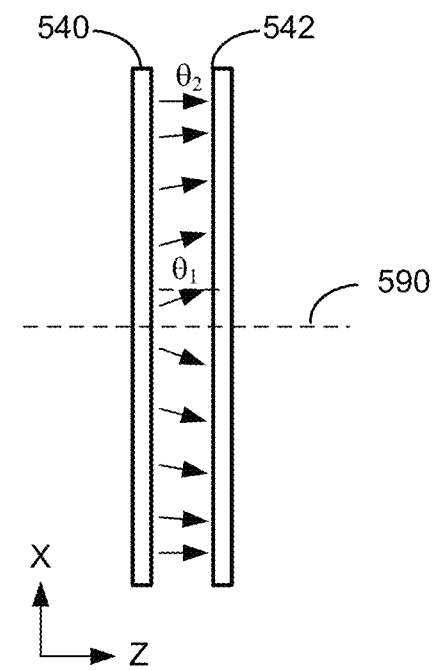

As explained above, FIGS. 7G and 7H show directions of light provided by the light source 540 in the y-z plane and FIGS. 7I and 7J show directions of light provided by the light source 540 in the x-z plane. In some embodiments, a light source may be configured to provide light in the directions in the y-z plane as shown in FIG. 7G or 7H and in the x-z plane as shown in FIG. 7I or 7J. For example, the light source 540 may provide light in directions shown in FIG. 7G in the y-z plane and in directions shown in FIG. 7I in the x-z plane. In another example, the light source 540 may provide light in directions shown in FIG. 7H in the y-z plane and in directions shown in FIG. 7J in the x-z plane. In yet another example, the light source 540 may provide light in directions shown in FIG. 7G in the y-z plane and in directions shown in FIG. 7J in the x-z plane. In yet another example, the light source 540 may provide light in directions shown in FIG. 7H in the y-z plane and in directions shown in FIG. 7I in the x-z plane.

Figure 8A:
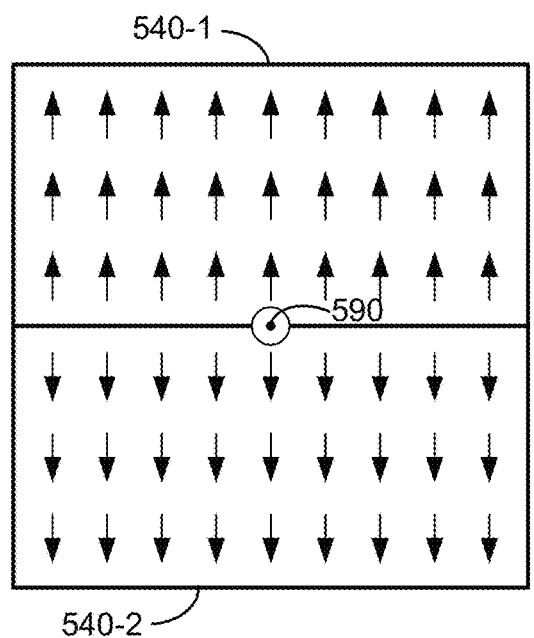
FIGS. 8A and 8B are schematic diagrams illustrating display modules in accordance with some embodiments.
Figure 8B:
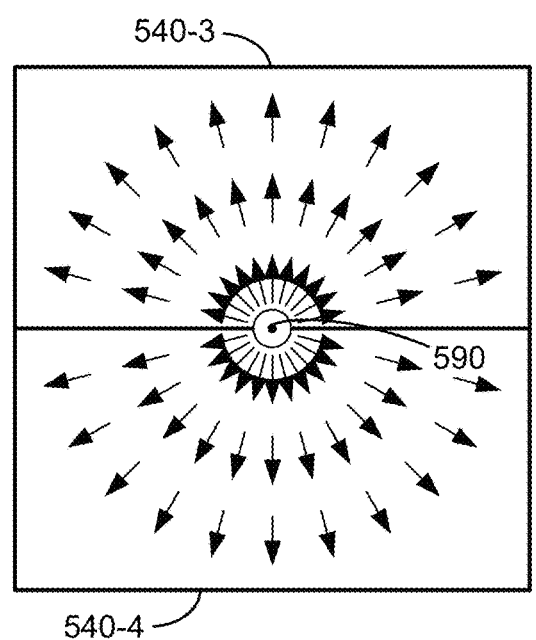

FIGS. 8A and 8B are schematic diagrams illustrating front elevational views of display modules in accordance with some embodiments.

FIG. 8A is a schematic diagram illustrating a front elevational view of a display device with two display modules 540-1 and 540-2. The display module 540-1 provides illumination light in directions away from the display module 540-2 and the display module 540-2 provides illumination light in directions away from the display module 540-1 (similar to the display module the side view of which is shown in FIG. 7H). In FIG. 8A, the display module 540-1 provides illumination light in a first common direction and the display module 540-2 provides illumination light in a second common direction that is distinct from the first common direction. In some embodiments, the display module 540-1 and the display module 540-2 are arranged in a reflective symmetry.

FIG. 8B is a schematic diagram illustrating a front elevational view of a display device with two display modules 540-3 and 540-4. The display module 540-3 provides illumination light in directions away from the display module 540-4 and the display module 540-4 provides illumination light in directions away from the display module 540-3 (similar to the display module the side view of which is shown in FIG. 7H). In FIG. 8B, the display module 540-3 provides illumination light in first radial directions and the display module 540-4 provides illumination light in second radial directions that are distinct from (e.g., opposite to) the first radial directions. Although FIG. 8B shows a display device with a rectangular area (e.g., a square area), in some configurations, the display device may have a different shape (e.g., a spherical area, an elliptical area, etc.).

In light of these principles and examples, now we turn to certain embodiments.

In accordance with some embodiments, a display device includes a display module (e.g., the display module 502 shown in FIG. 5A) for providing first image light. The display module includes at least a first region (e.g., the region 522 shown in FIG. 5D) from which the first image light (e.g., image light 570 shown in FIG. 5A) is provided in one or more directions other than a direction perpendicular to the first optical element. The display device also includes a first optical element (e.g., the first optical element 504 shown in FIG. 5A) positioned relative to the display device for receiving the first image light from the display device and transmitting the first image light (e.g., image light 570 shown in FIG. 5A). The display device further includes a second optical element (e.g., the second optical element 506 shown in FIG. 5A) separate from and positioned relative to the first optical element so that the second optical element receives the first image light transmitted through the first optical element and sends the received first image light back toward the first optical element as second image light (e.g., image light 572 shown in FIG. 5B), the first optical element receives the second image light from the second optical element and sends the second image light back toward the second optical element (e.g., image light 574 shown in FIG. 5C), and the second optical element receives and transmits the second image light from the first optical element (e.g., image light 574 shown in FIG. 5C).

In some embodiments, the first image light includes a first component having a first polarization and a second component having a second polarization orthogonal to the first polarization, and the second optical element sends both the first component having the first polarization and the second component having the second polarization back toward the first optical element (e.g., FIG. 6).

In some embodiments, the second image light includes the first component having the first polarization and the second component having the second polarization, and the first optical element receives from the second optical element and sends back toward the second optical element the first component having the first polarization and the second component having the second polarization back (e.g., FIG. 6).

In some embodiments, the display module foregoes providing light in a direction perpendicular to the first optical element (e.g., the display module shown in FIG. 7G does not provide light in any direction that is perpendicular to the first optical element or any direction that is parallel to the optical axis 590).

In some embodiments, the display module includes a spatial light modulator and one or more light sources positioned to provide illumination light to the spatial light modulator (e.g., the display module shown in FIG. 7G includes a light source 540 and a spatial light modulator 542).

In some embodiments, the one or more light sources are positioned to provide the illumination light in one or more directions other than an optical axis of the first optical element (e.g., the display module shown in FIG. 7H provides illumination light in one or more directions, including a ray that is parallel to the optical axis but does not overlap with the optical axis).

In some embodiments, the one or more light sources are positioned to provide the illumination light in one or more directions away from an optical axis of the first optical element (e.g., FIG. 7G).

In some embodiments, the one or more light sources are positioned to provide the illumination light in one or more directions other than any direction perpendicular to the first optical element (e.g., FIG. 7G).

In some embodiments, the one or more light sources include a first light source positioned to provide light at a first angle relative to an optical axis of the first optical element and a second light source positioned to provide light at a second angle, distinct from the first angle, relative to the optical axis of the first optical element (e.g., FIG. 7C).

In some embodiments, the one or more light sources include a laser; and the display module also includes a beam expander, freeform optics, and an optical diffuser.

In some embodiments, the one or more light sources are configured to provide the illumination light in radially symmetric directions (e.g., FIG. 8B).

In some embodiments, the one or more light sources are configured to provide the illumination light in axially symmetric directions (e.g., symmetric in either horizontal or vertical direction).

In some embodiments, the one or more light sources are configured to provide the illumination light in a non-symmetric pattern (e.g., FIG. 7C in which the tilt angles vary across the display module in a non-symmetric way, FIG. 7A in which the tilt angles are uniformly tilted away from the optical axis, etc.).

In some embodiments, the one or more light sources include a laser; and the display module also includes a waveguide.

In some embodiments, at least one of the first optical element or the second optical element is a holographic optical element.

In some embodiments, both the first optical element and the second optical element are holographic optical elements.

In some embodiments, the display module includes a second region (e.g., the region 524 shown in FIG. 5D) from which the first image light is provided in one or more directions including the direction perpendicular to the first optical element. The second region is mutually exclusive to the first region.

In some embodiments, the first image light is provided in one or more directions other than a direction perpendicular to the first optical element across an entire region of the display module.

Figure 5F:
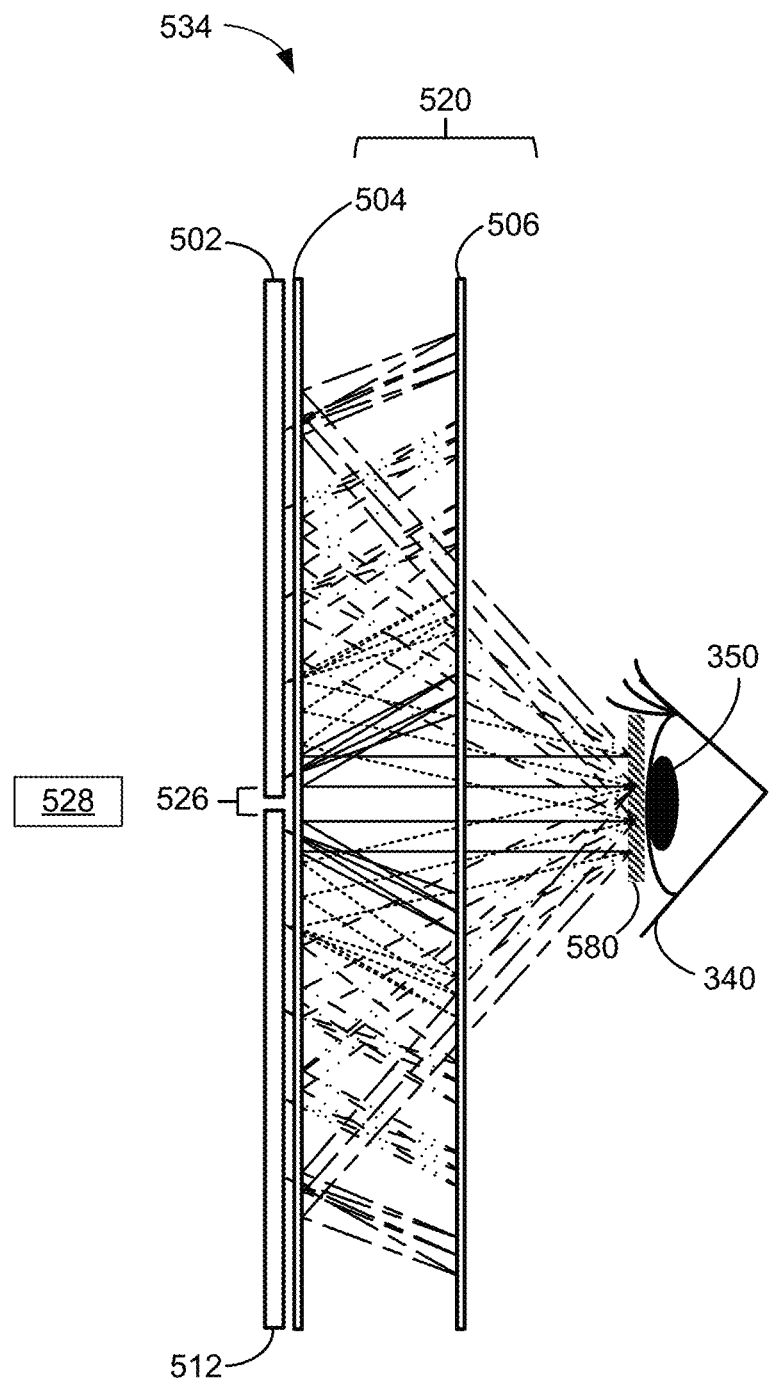

In some embodiments, the display module includes two or more display modules that are tiled adjacent to each other (e.g., the display modules 512 and 512 shown in FIG. 5F).

In some embodiments, the display module includes a central region from which no image light is provided (e.g., central region 526 shown in FIG. 5F). In some embodiments, the display device includes an eye tracking device positioned adjacently to the central region (e.g., the eye tracking device 528 shown in FIG. 5F).

In some embodiments, the first optical element receives the second image light from the second optical element and sends at least a portion of the second image light back toward the second optical element along the direction perpendicular to the first optical element (e.g., the image light 574 may be perpendicular to the first optical element 504).

In accordance with some embodiments, a head-mounted display device includes any display device described herein. For example, the display device described with respect to any of FIGS. 5A-5F and 6 may be included in the display device 205 shown in FIG. 2.

In accordance with some embodiments, an optical assembly (e.g., the optical assembly 520 shown in FIGS. 5A-5C) includes a first optical element (e.g., the first optical element 504) and a second optical element (e.g., the second optical element 506) separate from and positioned relative to the first optical element so that the second optical element receives first light transmitted through the first optical element in one or more directions other than a direction perpendicular to the first optical element (e.g., based on the angular selectivity of the first optical element) and sends the received first light back toward the first optical element as second light, the first optical element receives the second light from the second optical element and sends the second light back to the second optical element, and the second optical element receives and transmits the second light from the first optical element (e.g., toward an eye of a user).

In some embodiments, both the first optical element and the second optical element are holographic optical elements.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although the optical device including the first partial reflector and the second partial reflector is described for use in a head-mounted display device, the optical device including the first partial reflector and the second partial reflector may be used independently (and separately) from the head-mounted display device. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   a display module for providing first image light;
   a first optical element positioned relative to the display module for receiving the first image light from the display module and transmitting the first image light, wherein the display module includes at least a first region from which the first image light is provided in one or more directions other than a direction perpendicular to the first optical element; and
   a second optical element separate from and positioned relative to the first optical element so that the second optical element receives the first image light transmitted through the first optical element and sends the received first image light back toward the first optical element as second image light, the first optical element receives the second image light from the second optical element and sends the second image light back toward the second optical element, and the second optical element receives and transmits the second image light from the first optical element, wherein the display module foregoes providing light in a direction perpendicular to the first optical element.

2. The display device of claim 1, wherein:
   the display module includes a spatial light modulator and one or more light sources positioned to provide illumination light to the spatial light modulator.

3. The display device of claim 2, wherein:
   the one or more light sources are positioned to provide the illumination light in one or more directions other than an optical axis of the first optical element.

4. The display device of claim 2, wherein:
   the one or more light sources are positioned to provide the illumination light in one or more directions away from an optical axis of the first optical element.

5. The display device of claim 2, wherein:
   the one or more light sources are positioned to provide the illumination light in one or more directions other than any direction perpendicular to the first optical element.

6. The display device of claim 2, wherein:
   the one or more light sources include a laser; and
   the display module also includes a beam expander, freeform optics, and an optical diffuser.

7. The display device of claim 2, wherein:
the one or more light sources include a laser; and
the display module also includes a waveguide.

8. The display device of claim 2, wherein:
the one or more light sources are configured to provide the illumination light in axially symmetric directions.

9. The display device of claim 2, wherein:
the one or more light sources are configured to provide the illumination light in a non-symmetric pattern.

10. The display device of claim 1, wherein:
at least one of the first optical element or the second optical element is a holographic optical element.

11. The display device of claim 10, wherein:
both the first optical element and the second optical element are holographic optical elements.

12. The display device of claim 1, wherein:
the display module includes a second region from which the first image light is provided in one or more directions including the direction perpendicular to the first optical element, the second region being mutually exclusive to the first region.

13. The display device of claim 1, wherein:
the display module includes two or more display modules that are tiled adjacent to each other.

14. The display device of claim 1, wherein:
the display module includes a central region from which no image light is provided.

15. The display device of claim 1, wherein:
the first optical element receives the second image light from the second optical element and sends at least a portion of the second image light back toward the second optical element along the direction perpendicular to the first optical element.

16. A head-mounted display module, comprising the display device of claim 1.

17. A display device, comprising: wherein:
a display module for providing first image light;
a first optical element positioned relative to the display module for receiving the first image light from the display module and transmitting the first image light, wherein the display module includes at least a first region from which the first image light is provided in one or more directions other than a direction perpendicular to the first optical element; and
a second optical element separate from and positioned relative to the first optical element so that the second optical element receives the first image light transmitted through the first optical element and sends the received first image light back toward the first optical element as second image light, the first optical element receives the second image light from the second optical element and sends the second image light back toward the second optical element, and the second optical element receives and transmits the second image light from the first optical element, wherein:
the first image light includes a first component having a first polarization and a second component having a second polarization orthogonal to the first polarization; and
the second optical element sends both the first component having the first polarization and the second component having the second polarization back toward the first optical element.

18. The display device of claim 17, wherein:
the second image light includes the first component having the first polarization and the second component having the second polarization; and
the first optical element receives from the second optical element and sends back toward the second optical element the first component having the first polarization and the second component having the second polarization back.

19. An optical assembly, comprising:
a first optical element; and
a second optical element separate from and positioned relative to the first optical element so that the second optical element receives first light transmitted through the first optical element in one or more directions other than a direction perpendicular to the first optical element without light in a direction perpendicular to the first optical element and sends the received first light back toward the first optical element as second light, the first optical element receives the second light from the second optical element and sends the second light back to the second optical element, and the second optical element receives and transmits the second light from the first optical element.

* * * * *